United States Patent [19]

Smith

[11] Patent Number: 4,929,833

[45] Date of Patent: May 29, 1990

[54] FEEDBACK STABILIZED DIGITAL INFRARED DETECTOR CIRCUIT

[75] Inventor: Edgar M. Smith, Millersville, Pa.

[73] Assignee: Burle Technologies, Inc., Wilmington, Del.

[21] Appl. No.: 324,680

[22] Filed: Mar. 17, 1989

[51] Int. Cl.[5] .................................................. G01J 5/22

[52] U.S. Cl. .................................. 250/338.1; 250/342; 250/221; 315/159; 340/567

[58] Field of Search ...................... 315/159; 250/338.1, 250/342, 221; 340/567, 600

[56] References Cited

U.S. PATENT DOCUMENTS 4,618,770 10/1986 Maile .................................. 250/342
4,633,086 12/1986 Parrish ............................ 250/338.1
4,677,294 6/1987 Spector .............................. 250/342
4,705,946 11/1987 Cargille .............................. 250/342
4,843,283 6/1989 Chen .................................. 315/159
4,873,469 10/1989 Young et al. ....................... 250/342

*Primary Examiner*—Carolyn E. Fields
*Attorney, Agent, or Firm*—Martin Fruitman

[57] ABSTRACT

A digital infrared detector circuit which converts changes in detector current to time varying pulses and uses feedback to adjust the coincidence of a reference signal with the trigger signal to accommodate to circuit variations caused by changes in infrared detector sensitivity or ambient temperature. To supply a highly accurate feedback reference signal an internal high frequency oscillator is used for feedback control and counted down to furnish the reference signal. The conversion from detector current to time is accomplished by using the detector to discharge an accurately charged capacitor and measuring the time to recharge the capacitor.

6 Claims, 2 Drawing Sheets

SAMPLE OUT

REFERENCE OUT 54
52
SAMPLE PLUS (A)
50

TRIGGER IN (B)

60

CAPACITOR VOLTAGE (C)
60
56
62

FEEDBACK STABILIZED DIGITAL INFRARED DETECTOR CIRCUIT

SUMMARY OF THE DISCLOSURE

This patent deals generally with intrusion detection and more specifically with a circuit which responds to the radiant energy emitted by an intruder to activate an appropriate response.

Intruder detection circuits have become common household items. So much so that they are even used in situations which would not be considered "intrusions". The systems have become so commonplace and have been made so compact that they can now be used to replace common, everyday wall switches for the control of household lights.

In such situations, room or yard lights can be turned on, not only when some unwanted intruder activates the system, but also when residents merely walk through an area, thus automatically furnishing light only when it is needed, and turning the lights off automatically after a specific time period when no person's presence is detected.

However, this very increase in use brings greater demands for reliability and improved suppression of radio frequency interference. When each household has several such intrusion detectors everyone expects those lights to go on only when they are supposed to, and every time they are required to, and no one will tolerate the television picture being interfered with every time the kitchen lights go on.

Yet many existing detector circuits have just such problems. Sensitivity adjustments can be difficult to set and may vary with room temperature, and radio frequency interference can make the use of radios and televisions difficult in the proximity of a detector.

The present invention improves these situations by using digital control technology in conjunction with a passive infrared detector circuit. By using digital control technology rather than analog circuitry, the present invention furnishes a highly sensitive but easily adjustable circuit. This is accomplished by a digital circuit which converts the small variations in current from a pyroelectric infrared detector into distinguishable variations in the timing of standard pulses and thus attains an easily distinguishable parameter.

In the circuit of the present invention an internal high frequency clock oscillator is used to produce all required timing pulses by dividing its frequency down through several counters to secure reference and sample pulses with frequencies of 8 Hz and to time periods as long as large portions of an hour. These long times are selected by the user and used in the circuit to sample for a continued presence within the detector's range and to maintain the area lights on if one is found.

The reference and sample pulse rates of 8 Hz are used in the infrared detector circuit. The sample pulse is used to time and initiate a sequence which reads the detector output by converting the very small current variation due to radiation changes into a measurable variation in time. This time variation is then compared to the reference pulse time to determine if the detector has sensed motion.

One of the advantages of the present circuit is that it uses a feedback circuit to negate changes in the infrared detector caused by ambient temperature or changes in detector sensitivity. To accomplish this a digital feedback circuit compares the timing of the detector output pulse with the reference pulse time, and by means of a long time constant charging circuit, changes the bias on the infrared detector to modify its current and constantly act to realign the two pulses. This circuit holds the time variation to about 5 microseconds when the infrared detector is quiescent, but does not interfere with its detection action.

The present invention therefore supplies a feedback stabilized digital infrared detection circuit which reliably detects motion within the field of view of the infrared detector, but does not vary in sensitivity with ambient temperature or component aging.

DETAILED DESCRIPTION OF THE INVENTION

Figure 1:
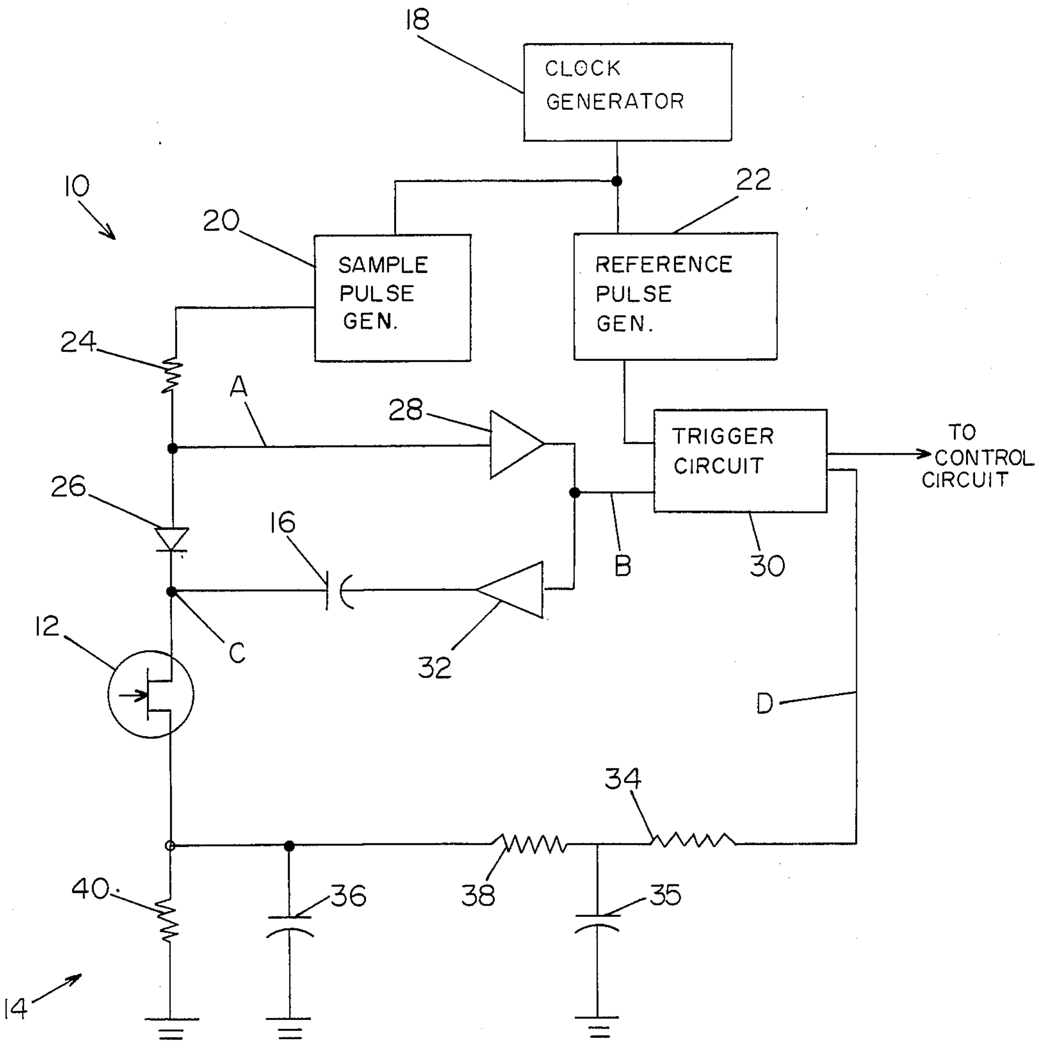
FIG. 1 is a simplified diagram of the circuit of the preferred embodiment of the invention.

The preferred embodiment of the invention is depicted in simplified circuit form in FIG. 1 in which motion detector circuit 10 comprises pyroelectric infrared detector 12, feedback circuit 14, and sample capacitor 16.

The timing of all functions of detector circuit 10 is controlled by clock generator 18 which, in the preferred embodiment, furnishes an 8 Hz clock pulse to both sample pulse generator 20 and reference pulse generator 22.

Sample pulse generator 20 initiates the sequence which reads the status of detector 12.

The output of sample pulse generator 20 is a rectangular pulse of approximately 4 milliseconds which acts through resistor 24 and diode 26 to charge capacitor 16. In the preferred embodiment resistor 24 and capacitor 16 are selected to produce a charging rate of about 300 v/sec. and to assure that the charging occurs on the essentially linear portion of the R-C charging slope. As the voltage on line A, which is the input to logic circuit 28, increases it rises to the threshold point of logic circuit 28 which then operates and generates an output pulse on line B which is fed to trigger circuit 30 and through logic circuit 32 to capacitor 16. Therefore, diode 26 is reverse biased and prevents any further charging of capacitor 16. Thus, although the voltage at line A follows the input pulse from sample pulse generator 20, point C where capacitor 16, diode 26, and detector 12 are joined is accurately raised to the exact same voltage, the threshold voltage of logic circuit 28, by every pulse from sample generator 20.

It is during the period between the sample pulses that detector 12 performs its function. Although the current change which occurs in detector 12 due to the presence of an object in its field is only of the order of one nanoampere, this difference can cause a significant change in the voltage to which capacitor 16 is discharged in the time period between sample pulses. This time period is about one-eighth of a second in the preferred embodiment of the invention, so that capacitor 16 which is 0.02 microfarads is substantially discharged.

Then, when the next sample pulse is applied to lines A and C, the voltage level to which capacitor 16 was discharged is converted to a time measurement for digital processing and comparison. This results because, with the linear charging slope which was previously described, the time at which logic circuit 28 is activated and generates a pulse onto line B will vary directly with the voltage level at which the charging of capacitor 16 began, that is, the level to which it was discharged. The pulse at point B will therefore vary in time relative to the beginning of the sample pulse based on the signal affecting detector 12.

Reference pulse generator 22 generates a pulse beginning exactly at the midpoint of the sample pulse from generator 20, the relationship of the two pulses being fixed because they are both activated by clock generator 18. Moreover, the design of the charging circuit is such that, when radiation to the detector is unchanging, the trigger input at line B will occur simultaneously with the beginning of the reference pulse from generator 22. However, differences in the transistor characteristics of detector 12, or changes in ambient temperature can change the quiescent detector current, and such changes would affect the circuit operation if no adjustment were made.

This adjustment is made automatically by feedback circuit 14 and is constantly adjusted throughout the operation of the circuit. This automatic adjustment is accomplished by trigger circuit 30 which also generates the signal to activate the lamps or other device controls (not shown) which motion detector circuit 10 is to operate.

Trigger circuit 30 uses conventional digital techniques and compares the timing of the pulse output of logic circuit 28 to the time of the pulse output of reference generator 22 and generates an output signal to the control circuit if the time difference between the two exceeds a predetermined value. However, regardless of whether the time difference is sufficient to generate an output signal to the control circuits, a signal is generated on output line D of trigger circuit 30 and is fed to feedback circuit 14. The trigger circuit 30 output on line D is presented as a high or low logic level, the level being low if the signal on line B precedes the reference pulse and high otherwise. This level persists until it is reset during the sample period, and is used to charge capacitors 35 and 36 through resistors 34 and 38, thus applying a bias voltage to detector 12 across resistor 40. This bias voltage adjusts the current through detector 12 and thereby adjusts the timing of the detector pulse on line A. The long time constants selected for capacitors 35 and 36 and resistors 34 and 38 result in small adjustments to the detector circuit with every sample pulse and thus assures that feedback circuit 14 maintains the circuit in proper adjustment for the quiescent condition of detector 12.

FIG. 2 is a pulse timing diagram of several of the locations of the circuit of FIG. 1.

Figures 2A, 2B, 2C, 2D, 2E:
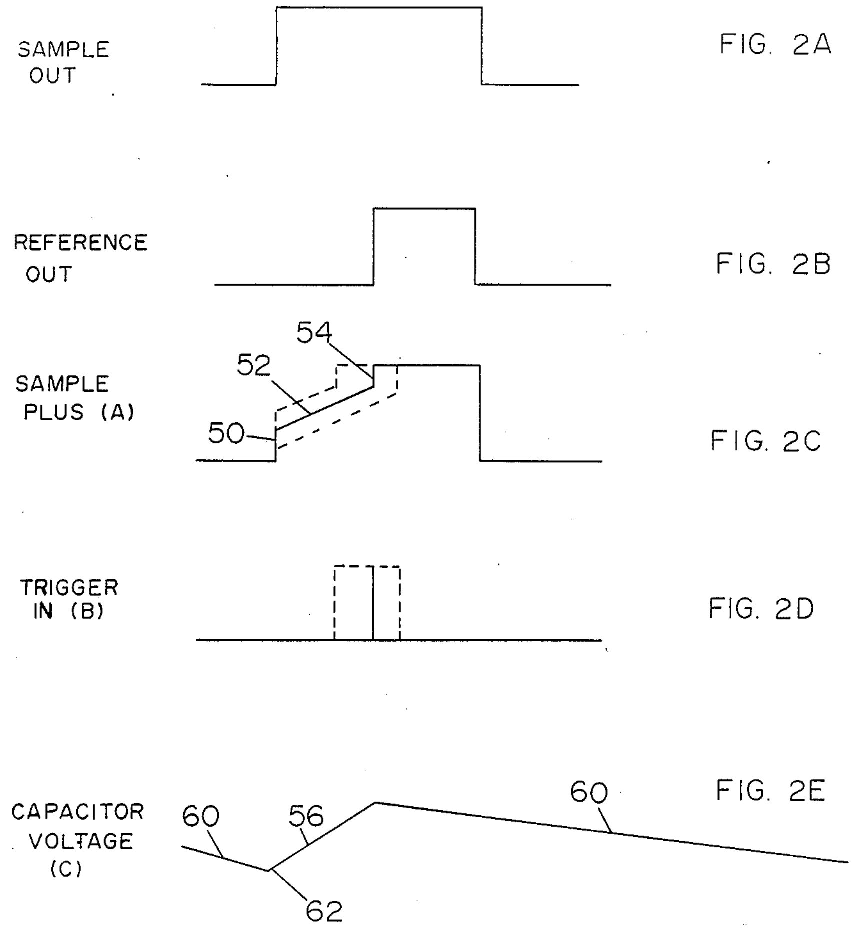
FIG. 2 is a pulse timing diagram of various locations in the circuit of FIG. 1.

FIG. 2A shows the timing of a typical sample pulse generated by sample pulse generator 20. This pulse is typically approximately 4 milliseconds long and is repetitive at 8 Hz.

FIG. 2B shows a typical reference pulse generated by reference pulse generator 22. This pulse is synchronous with the sample pulse, begins at the midpoint of the sample pulse, and is one-half as long as the sample pulse.

FIG. 2C shows the pulse voltage at point A in FIG. 1 which is essentially the sample pulse as affected by resistor 24, capacitor 16 and diode 26. This waveform begins its rise 50 with the sample pulse then follows the charging voltage 52 of capacitor 16 until logic circuit 28 reaches its threshold voltage and then rises at time 54 to the sample pulse voltage in a step function.

FIG. 2D shows the trigger pulse at line B in FIG. 1. This pulse is initiated simultaneously with logic circuit 28 reaching its threshold voltage.

FIG. 2E shows the voltage at point C in FIG. 1. This is the voltage across capacitor 16. The voltage rise 56 begins as the sample pulse charges capacitor 16 and ends at the time of reaching the threshold voltage of logic circuit 28 less the forward voltage of diode 26. At that point the action of detector 12 begins to discharge the voltage 60 of capacitor 16, and the current through detector 12, which is determined by the radiation falling upon it, determines how far capacitor 16 will discharge during the fixed time period between the sample pulses. As previously described, it is the discharge current which determines the voltage level 62 at which the charging of capacitor 16 will begin, and therefore determines the time required for line A to reach the threshold level of logic circuit 28 which initiates the trigger pulse.

The present invention thereby furnishes a highly sensitive but highly accurate circuit which reacts to variations in radiation changes in the field of view of an infrared detector, but is insensitive to those factors such as component aging which may cause calibration errors.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

What is claimed as new and for which Letters Patent of the United States are desired to be secured is:

1. A digital control circuit operated by changes of radiation received by an infrared detector comprising:
   - an infrared detector with first and second terminals which varies the current flowing through it based upon variations of radiation within its field of view with its first terminal interconnected with a circuit return;
   - a first capacitor with first and second terminals the first terminal being connected to the second terminal of the infrared detector;
   - a diode with a positive and a negative terminal and its negative terminal connected to the junction of the first capacitor and the infrared detector;
   - a digital clock generator generating a clock pulse;
   - a sample pulse generator connected to the output of the clock generator and generating a sample pulse synchronized to the clock pulse, the sample pulse being of sufficient voltage, current and pulse length to charge the first capacitor to a measurable voltage during the sample pulse length, and the sample generator pulse output being connected to the positive terminal of the diode;
   - a first logic circuit, with an input and an output, which generates an output pulse on its output when the voltage on its input is raised to a specific level, the input of the first logic circuit being connected to the positive terminal of the diode and the output being interconnected with the second capacitor terminal;
   - a reference pulse generator connected to the output of the clock generator and synchronized with the sample pulse generator, the reference pulse generator producing a reference pulse which begins during the sample pulse; and a trigger circuit, one input connected to the output of the reference pulse generator and another input to the output of the first logic circuit, the trigger circuit generating a signal on a first output to activate an external control circuit when the reference pulse and the output of the first logic circuit deviate in time by more than a preselected amount.

2. The digital control circuit of claim 1 wherein the interconnection between the output terminal of the first logic circuit and the second capacitor terminal is a second logic circuit.

3. The digital control circuit of claim 1 wherein the interconnection between the infrared detector and the circuit return is a feedback control circuit which varies the infrared detector current based on the time deviation between the reference pulse and the output of the first logic circuit when the infrared detector is quiescent.

4. The digital control circuit of claim 1 wherein the interconnection between the infrared detector and the circuit return is a resistor and a second capacitor in parallel and a feedback control voltage is fed to the junction of the infrared detector and the parallel resistor and second capacitor.

5. The digital control circuit of claim 1 further including a feedback circuit stabilizing the infrared detector, the feedback circuit comprising:

a parallel resistor and a second capacitor interconnecting the infrared detector and the circuit return; and a second output from the trigger circuit which generates a second output pulse the length of which varys with the deviation in time between the reference pulse and the output of the first logic circuit, the second output of the trigger circuit being interconnected with the junction of the infrared detector and the parallel resistor and second capacitor.

6. The digital control circuit of claim 5 further including a resistor and capacitor charging circuit inserted between the trigger circuit and the infrared detector and the parallel resistor and second capacitor.

* * * * *